United States Patent [19]

Ionescu

[11] Patent Number: 4,509,783
[45] Date of Patent: Apr. 9, 1985

[54] SMART HAND

[76] Inventor: Alexandru D. Ionescu, 190 Sport Hill Rd., Easton, Conn. 06612

[21] Appl. No.: 454,190

[22] Filed: Dec. 29, 1982

[51] Int. Cl.³ ............................ B66C 3/16; F15B 13/42
[52] U.S. Cl. ...................................... 294/88; 294/106; 414/730
[58] Field of Search ...................... 294/88, 106, 94, 95, 294/96, 99 S, 86 R, 86.3, 86.31; 414/730, 736, 739, 741, 744 A, 753, 621

[56] References Cited
U.S. PATENT DOCUMENTS 3,952,880  4/1976  Hill et al. .............................. 294/106
4,397,495  8/1983  Lewis ................................... 414/730

Primary Examiner—James B. Marbert
Attorney, Agent, or Firm—Arthur T. Fattibene

[57] ABSTRACT

A gripper device having a body formed with a piston chamber in which a piston is reciprocally mounted. Connected to the body are a pair of spaced fingers. A cross bar is connected to the piston and oppose toggle links interconnect the ends of the cross bar to the adjacent fingers so that actuation of the piston effects the operation of the fingers between an open and closed position. A first sensor device is disposed between the fingers to measure the lateral distance therebetween, and a second sensor is disposed between the body and a movable cap supported thereon to measure longitudinal displacement between the cap and associated body.

4 Claims, 2 Drawing Figures

SMART HAND

BRIEF SUMMARY OF THE INVENTION

The invention relates to an apparatus which has four main features:

It can grip and hold a part between fingers.

It can indicate the position of the fingers: completly open, completly closed or part present between fingers.

It can measure the part which is gripping between fingers.

It can sense a force applied along the longitudinal axis of the gripper.

DETAILED DESCRIPTION OF THE INVENTION

Figure 1:
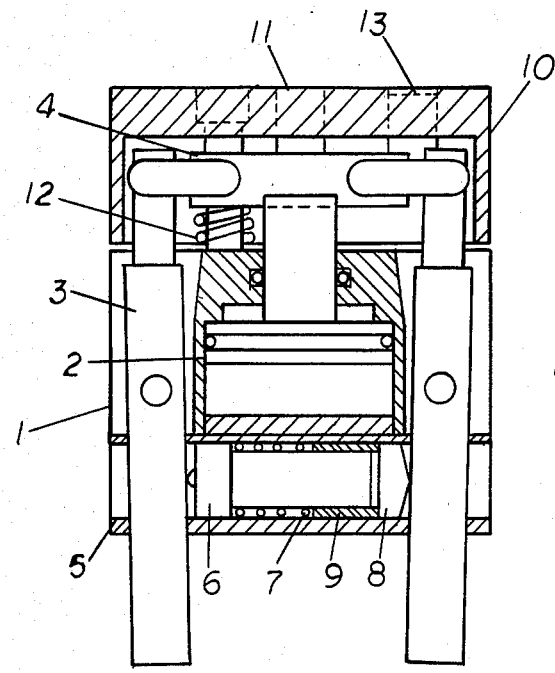
FIG. 1 is a sectional view of the sensorized gripper (the smart hand).
Figure 2:
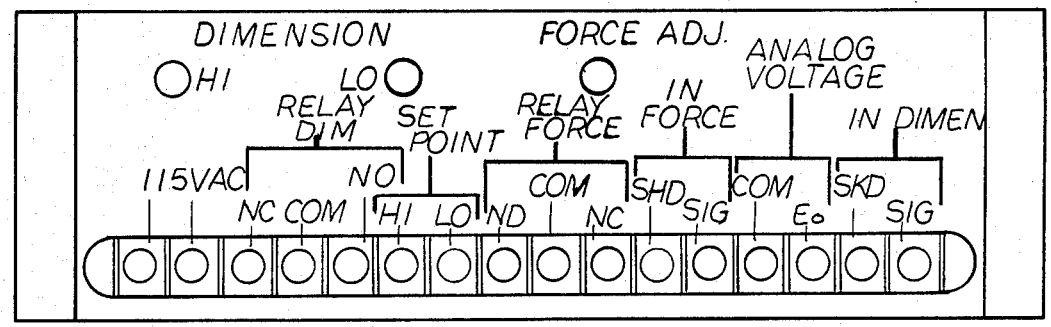
FIG. 2 is a view of the electronic control box.

The present invention relates to a device for pick and place operations. This gripper is an air operated device with two moving fingers which close simultaneously to hold a part. Refering to FIG. 1 of the drawings, the gripper device includes a body 1. Inside the body there is the piston 2, which by moving up and down under air pressure actuates the two fingers 3 by the cross bar 4. The lower cap 5, comprise the linear displacement sensor 6, a spring 7, the target 8, and a plastic sleeve 9. The upper cap 10, can slide on two dowell pins 11, which are pressed in the body. There are two springs 12, between the upper cap and the body, and a linear displacement sensor 13.

The electronic control module contains standard components, available on the market, and provides input for the two linear displacement sensors in the gripper as well as an output analog voltage and/or relay output. When the gripper fingers are open the output voltage is maximum and when the fingers are closed the output voltage is minimumm. When the fingers close on a part an analog voltage between 2 V and 8 V can be measured, depending on the part size. By adjusting the hi and lo setpoints for a prechoosen tolerance the gripper device can signal parts acceptance or out-of-tolerance parts rejection. This information can be derived from the analog voltage output or from the relay output. While the present invention has been described in connection with a preferred embodiment thereof, it will become aparent to those persons skilled in the art that various modifications are possible. It is desired therefore, that the invention not be limited to the details of construction illustrated and described hereinabove and is intended by the appended claims to cover all modifications which fall within the spirit and scope of the invention.

I claim:

1. A gripper comprising; a body having a piston chamber formed therein, a piston means reciprocally mounted in said chamber, a pair of fingers pivotally mounted intermediate their ends thereof to said body, a cross-bar connected to said piston means, said cross bar being disposed between said fingers, a toggle link interconnecting said cross-bar to each of said fingers whereby the actuation of said piston means effects the displacement of said fingers accordingly, and a sensor means interposed between said fingers for measuring the lateral distance between said fingers upon the actuation of said piston means.

2. A gripper as defined in claim 1 and including an upper cap moveably connected to said body, and a second sensor means interposed between said upper cap and said body.

3. A gripper as defined in claim 1 and including spring means interposed between said body and cross-bar for exerting a spring bias on said cross-bar.

4. A gripper as defined in claim 2 wherein said first mention sensor means is latterally disposed between said fingers, and said first mentioned sensor means includes linear displacement sensor, a target disposed opposite said displacement sensor, a plastic sleeve disposed adjacent said target, and a spring interposed between said sleeve and said displacement sensor for imposing a spring bias on said displacement sensor.

* * * * *